United States Patent
Combs et al.

[15] 3,668,157

[45] June 6, 1972

[54] BLEND CONTAINING AT LEAST A CELLULOSE ESTER AND A BLOCK COPOLYMER ELASTOMER

[72] Inventors: Robert L. Combs; Richard T. Bogan, both of Kingsport, Tenn.

[73] Assignee: Eastman Kodak Company, Rochester, N.Y.

[22] Filed: July 23, 1970

[21] Appl. No.: 57,775

[52] U.S. Cl. ..................................................260/13, 260/16
[51] Int. Cl. ................C08b 21/08, C08g 39/10, C08g 41/04
[58] Field of Search ...............................................260/13, 16

[56] References Cited

UNITED STATES PATENTS

| | | |
|---|---|---|
| 3,213,046 | 10/1965 | Harrington et al.........................260/13 |
| 3,386,932 | 6/1968 | Steinmann...............................260/13 |
| 3,387,061 | 6/1968 | Smith et al...............................260/13 |

*Primary Examiner*—William H. Short
*Assistant Examiner*—Edward Woodberry
*Attorney*—George P. Chandler and Cecil D. Quillen, Jr.

[57] ABSTRACT

Cellulose ester compositions useful for producing optically clear extruded sheets, or molded or vacuum-formed products having high impact strength and toughness, said compositions being composed of (I) a cellulose ester, (II) a block copolymer elastomer which contains polyester or polyurethane segments. Such compositions may optionally contain a polyalkylacrylate or polyalkylacrylate-methacrylic acid polymer and/or a plasticizer for the cellulose ester component.

13 Claims, No Drawings

EXAMPLE 11

A blend of 17 parts by weight of the cellulose acetate butyrate described in Example 1 with 2 parts by weight of the elastomer described in Example 1, and 1 part by weight of an 85/15 ethylacrylate-methacrylic acid copolymer is prepared by processing the mixture in an extruder at 220° C. with a 3,000 pound back pressure. Testing bars molded from the blend have an Izod impact strength of 6.4 foot pounds per inch of notch at 23° C.

EXAMPLE 12

A blend of 18 parts by weight of the cellulose acetate butyrate described in Example 1 with 2 parts by weight of the elastomer described in Example 1 is prepared by processing the mixture in an extruder at 220° C. with a 3,000 pound back pressure. Testing bars molded from the resulting blend have an Izod impact strength of 5.4 foot pounds per inch of notch at 23° C.

EXAMPLE 13

A blend of 17 parts by weight of the cellulose acetate butyrate described in Example 1, 2 parts by weight of the block copolymer elastomer described in Example 1, and 1 part by weight of a polyester prepared by polymerizing a mixture of 60 percent isophthalic and 40 percent terephthalic acids with 1,4-cyclohexanedimethanol is prepared by processing the mixture in a Brabender Plasti-Corder at 190°–200° C. Testing bars molded from the resulting blend have an Izod impact strength of 2.56 foot pounds per inch of notch at 23° C. Bars molded from this tricomponent blend suffer complete loss of optical clarity and the compatibility between the two major components appears to be decreased by the addition of the polyester, e.g., suffers severe blushing.

EXAMPLE 14

A blend of 14 parts by weight of cellulose acetate (39.7 percent acetyl groups, 3.4 percent hydroxyl groups), 2 parts by weight of the block elastomer copolymer described in Example 1 and 4 parts by weight of dibutyl phthalate are prepared by processing the mixture in a Brabender Plasti-Corder at 200° C. Testing bars molded from the resulting blend are found to have a notched Izod value of 4.1 and a transparency ratio of 26.7.

EXAMPLE 15

A blend of 15 parts by weight of a cellulose acetate propionate (2.5 percent acetyl groups, 45 percent propionyl groups, 2 percent hydroxyl groups), 2 parts by weight of the block elastomeric copolymer described in Example 1 and 3 parts by weight of dibutyl sebacate is prepared by processing the mixture in a Brabender Plasti-Corder at 170° C. Testing bars molded from the resulting blend are found to have a notched Izod value of 8.4 and a transparency ratio of 34.0.

EXAMPLE 16

A blend of 15 parts by weight of the cellulose acetate butyrate described in Example 1, 2 parts by weight of the block elastomeric copolymer described in Example 1, 1 part by weight of the polyethylacrylate used in Example 10, and 2 parts by weight of dioctyl phthalate is prepared by processing the mixture in a Brabender Plasti-Corder at 180° C. Testing bars molded from the resulting blend are found to have a notched Izod value of 5.2 and a transparency ratio of 31.3.

The quantitative resistance to "blushing" on impact or bending of the sample can be measured by the number of inches-ounces as delivered by the Gardner Impact Tester (Gardner Laboratory, Inc.; Bethesda, Maryland) required to delaminate the sample. Many of the samples used as controls (Examples 2, 4 and 6) were so brittle that they shattered before any delamination was observed. The transparency ratio, notched Izod values and the number of inch-ounces required to delaminate all of the products of the above examples are shown in the following table:

| Example | $I_0/I_1 0$ | Notched Izod Ft. Lb./In. Notch | No. In. Oz. Required to Delaminate |
|---|---|---|---|
| 1 | 24.3 | 3.4 | 20 |
| 2 | 31.6 | 1.0 | — |
| 3 | 26.5 | 4.5 | 24 |
| 4 | 31.8 | 1.1 | — |
| 5 | 26.0 | 7.8 | 32 |
| 6 | 30.9 | 1.8 | — |
| 7 | 1.1 | 1.4 | (1) |
| 8 | 1.0 | 1.7 | (1) |
| 9 | 1.0 | 1.5 | (1) |
| 10 | 28.5 | 6.0 | 64 |
| 11 | 29.8 | 6.4 | 96 |
| 12 | 24.5 | 5.4 | 28 |
| 13 | 1.1 | 2.6 | (1) |
| 14 | 26.7 | 4.1 | 34 |
| 15 | 34.0 | 8.4 | 39 |
| 16 | 31.3 | 5.2 | 78 |

(1) Blushed on molding and could not be tested.

Examples 1, 3, 5, 10, 11, 12, 14, 15 and 16 provide examples of the novel and improved compositions obtainable by practice of the present invention and clearly show that such products are characterized by toughness, clarity, and resistance to delamination upon impact. Examples 1, 3, 5 and 12 are bicomponent blends, whereas Examples 10, 11, 14 and 15 are tricomponent blends. Example 16 is a four-component blend. The samples used as controls either lacked clarity (Examples 7, 8, 9, 13) and/or toughness (Examples 2, 4, 6).

It will be evident from the above description and examples that the present invention provides a novel and valuable cellulose ester composition particularly useful for producing optically clear extruded sheets or molded or vacuum-formed products having high impact strength and toughness. Such products are further characterized by an unusually high resistance to blushing upon impact. In view of the well known properties of the components of our composition, it was entirely unexpected and surprising to find that blended in the proportions described herein a high degree of compatibility and resultant toughness and clarity were obtained. Other characteristics and valuable properties of our compositions will be apparent to those skilled in the art.

Although the invention has been described in considerable detail with reference to certain preferred embodiments thereof, it will be understood that variations and modifications can be effected without departing from the spirit and scope of the invention as described hereinabove.

We claim:
1. Composition comprising a physical blend of components as follows:
   I. about 60 to about 98 percent by weight of the composition of cellulose acetate, cellulose acetate propionate, cellulose acetate butyrate, or cellulose dibenzoate, or a combination of said cellulose esters.
   II. about 2 to about 40 percent by weight of the composition of an elastomeric block copolymer having an elongation of at least about 90 percent and consisting essentially of repeating units having the following formula:
   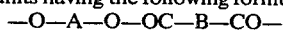
   —O—A—O—OC—B—CO—
   wherein —O—A—O— if from an amorphous polyether or polyester having a molecular weight from about 500 to about 10,000 and provides from about 60 to about 90 percent by weight of the block copolymer and —OC—B—CO— if from a crystalline polyester or polyurethane having a melting point above about 150° C. and said block copolymer has an inherent viscosity of at least about 1.5 measured at about 25° C. at a concentration of about 0.25 percent by weight in 60/40 parts by weight of phenol/tetrachloroethane.

2. Composition of claim 1 comprising the following additional component:
   III. from about 2 to about 10 percent by weight of the composition of an acrylic polymer or copolymer consisting essentially of 70 to 100 percent of the same or a combination of repeating units having the following formula:

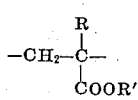

wherein R is a hydrogen atom or a methyl group and R' is a methyl or ethyl group, and up to 30 percent of repeating units having the same formula wherein R' is hydrogen or units from any other copolymerizable vinyl polymer, said acrylic polymer having an inherent viscosity measured at about 25° C. at a concentration of about 0.25 percent by weight in dimethylformamide of at least abut 0.3.

3. Composition of claim 1 comprising the following additional component:
   IV. from about 0.5 to about 38 percent by weight of the composition of a plasticizer for said component (I).

4. Composition of claim 1 comprising the following additional components:
   III. from about 2 to about 10 percent by weight of the composition of an acrylic polymer or copolymer consisting essentially of 70 to 100 percent of the same or a combination of repeating units having the following formula:

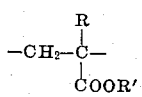

wherein R is a hydrogen atom or a methyl group and R' is a methyl or ethyl group, and up to 30 percent of repeating units having the same formula wherein R' is hydrogen or units from any other copolymerizable vinyl polymer, said acrylic polymer having an inherent viscosity of at least about 0.3 as measured at about 25° C. at a concentration of about 0.25 percent by weight in dimethylformamide.

IV. from about 0.5 to about 38 percent by weight of the composition of a plasticizer for said component (I).

5. Composition of claim 1 having a transparency ratio greater than 20 wherein said ratio is defined as follows:

$$\frac{I_0°}{I_1°}$$

said ratio being determined for a sheet 0.125 inch thick using a photometer and I is the intensity of light transmitted at 0° and 1° with reference to an incident beam of monochromatic light having a wave length of 546 millimicrons.

6. Composition of claim 1 having a notched Izod impact strength of at least about 3.

7. Composition of claim 1 wherein said component (II) has an elongation of at least 300 percent.

8. The composition of claim 1 in which the cellulose ester is cellulose acetate.

9. The composition of claim 1 in which the cellulose ester is cellulose acetate propionate.

10. The composition of claim 1 wherein the cellulose ester is cellulose acetate butyrate.

11. The composition of claim 1 in which the cellulose ester is cellulose dibenzoate.

12. A composition pertaining to claim 1 which contains 85 percent of a cellulose acetate butyrate containing 37 percent butyryl groups, 13 percent acetyl groups and 2 percent hydroxy groups; 10 percent of a block copolyetherester having an inherent viscosity of 2.2 is measured at 25° C. at a concentration of about 0.25 percent by weight in 60/40 parts by weight phenol/tetrachloroethane solution, and consisting of 81 percent of a 3,800 molecular weight poly(tetramethylene glycol) modified with 6 percent of 8-oxabicyclononane, and 19 percent poly(1,4-cyclohexylenedimethylene terephthalate); and 5 percent of a polyethylacrylate having an inherent viscosity in dimethylformamide of 1.0.

13. The composition of claim 1 in which the elastomeric block copolymer is a polyetherurea prepared from a mixture of 2.2 mole parts of 2,000 molecular weight poly(tetramethyleneglycol) poly(tetramethylene glycol) one mole part of 8-oxabicyclononane modified poly(tetramethylene glycol) containing 8 percent of 8-oxabicyclononane with a polar segment consisting of p-xylene diisocyanate and 1,4-cyclohexane-bis(methylamine) having an inherent viscosity of 4.7.

* * * * *

UNITED STATES PATENT OFFICE
CERTIFICATE OF CORRECTION

Patent No. 3,668,157     Dated June 6, 1972

Inventor(s) Robert L. Combs et al

It is certified that error appears in the above-identified patent and that said Letters Patent are hereby corrected as shown below:

In the grant only, insert the attached pages; columns 1 through 4:

Signed and sealed this 26th day of December 1972.

(Seal)
Attest:

EDWARD M. FLETCHER, JR.
Attesting Officer

ROBERT GOTTSCHALK
Commissioner of Patents

BLEND CONTAINING AT LEAST A CELLULOSE ESTER AND A BLOCK COPOLYMER ELASTOMER

This invention relates to compositions of a cellulose ester containing between about 2 weight percent to 40 weight percent of block copolymer elastomeric material having 10 weight percent or more of a polar segment such as a polyester or a polyurethane. The invention also concerns the optional addition of from about 2 to about 10 weight percent of certain polyalkylacrylates or alkylacrylate-methacrylic acid copolymer to the above blends to impart even greater compatibility, e.g., less tendency to "blush" (become opaque when stress is applied). The invention also concerns the optional addition of from about 0.5 weight percent to about 38 weight percent of a plasticizer for the cellulose ester.

Cellulose esters such as cellulose acetate, propionate and butyrate are conventionally provided commercially in a plasticized form, which, of course, improves the toughness thereof but reduces the hardness and stiffness. For many applications such as decorative sign faces and articles wherein resistance to abrasion and impact is important, the plasticized cellulose esters do not give optimum performance.

In attempts to solve this problem it has been proposed to blend unplasticized cellulose esters with various other polymeric materials such as homopolymeric elastomers. Such blend composition, however, failed to meet commercial standards and showed marked incompatibility with essentially complete loss of optical clarity with no significant improvement in impact strength.

Objects, therefore, of the present invention are to provide new and improved cellulose ester compositions having greater impact strength than the unmodified cellulose ester, while retaining the optical clarity of the unmodified cellulosic; and to provide improved impact resistant cellulose ester compositions without materially sacrificing the other physical properties or the processibility of the cellulose esters.

These and other objects hereinafter appearing have been attained in accordance with the present invention through the discovery that certain block copolymer elastomers, hereinafter described in detail, are highly compatible with cellulose esters and impart excellent notched Izod impact strength thereto of the order of at least about 3 foot pounds per inch of notch at 23° C. while maintaining highly acceptable optical properties. In comparison, the unmodified, unplasticized cellulose esters give a notched Izod impact strength of only about 1 foot pound per inch of notch at 23° C. As aforesaid the addition of certain acrylic polymers and copolymers to the blend results in further unexpected improvements.

More specifically, the novel compositions of our invention are two, three, or four-component mixtures or blends, Component (I) being a cellulose ester, Component (II) being a block copolymer elastomer, Component (III) being an acrylic polymer or copolymer and Component (IV) being a plasticizer for the cellulose ester component.

Referring to Component (I), the cellulose ester plastic material may be cellulose acetate, cellulose butyrate, cellulose propionate, cellulose acetate butyrate, cellulose tributyrate, or cellulose dibenzoate. As is commonly known, the acetates, propionates and butyrates are not employed in their completely esterified state but are actually back hydrolyzed to reduce the degree of esterification and increase their plasticizability. For example, the actual acetyl content of cellulose acetate may range from about 36 to about 42 percent by weight for most applications, although more or less acetylation could be employed. Both higher and lower degrees of esterification may result in embrittlement and loss of good physical properties. Excessive back hydrolysis may produce a gelled material. Also, as is well known, the cellulose butyrate and cellulose propionate esters contain acetyl groups. For example, the cellulose butyrates would be expected to contain from about 15 to about 50 percent butyryl, and the remainder acetyl and/or hydroxy groups. The preferred cellulose acetate butyrate contains 37 percent butyryl groups, 13 percent acetyl groups and 2 percent hydroxyl groups. Likewise, the cellulose propionates would be expected to contain from about 13 to about 48 percent propionyl, and the remainder acetyl and/or hydroxy groups.

Component (II) is a block copolymer elastomer having an inherent viscosity from about 1.5 to about 7.0. Such a polymer is typified by poly(1,4-cyclohexylenedimethylene terephthalate) modified by poly(tetramethylene glycol) as described in U.S. Pat. No. 3,261,812, British Pat. No. 1,118,731, and U.S. Pat. No. 3,023,192.

More specifically, these block copolymers are elastomeric copolymers having an elongation of at least 90 percent (advantageously greater than 300 percent) and whose molecular chains consist essentially of repeating units having the following formula:

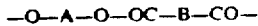

wherein O—A—O is from an amorphous polyether or polyester having a molecular weight from 500 to 10,000, and consists essentially of from about 60 percent to about 90 percent by weight of the copolymer; and —OC—B—CO— is from a crystalline polyester, polyurea or polyurethane having a melting point above 150° C. A preferred block copolymer is a copolyetherester consisting of about 81 percent of a 3,800 molecular weight poly(tetramethylene glycol) modified with 6 percent of 8-oxabicyclononane, and 19 percent poly(1,4-cyclohexylenedimethylene terephthalate), said block copolymer having an inherent viscosity of 2.2 as measured in 60/40 phenol/tetrachloroethane at a concentration of 0.25 percent by weight at 25° C.

Component (III) is composed essentially of a polymer or a copolymer containing at least 70 percent of units (based on total units) having the following formula:

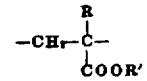

where R is a hydrogen atom or a methyl group and R' is a methyl or an ethyl group. This polymer has an inherent viscosity in dimethylformamide at 25° C. of at least about 0.3 up to about 5.0 or greater. Up to 30 percent of these units may have the same formula given above where R' is hydrogen or may be from any other vinyl polymer. A preferred polyalkylacrylate is a polyethylacrylate having an inherent viscosity in dimethylformamide of 1.0.

Component (IV) is one or more of any well known ester plasticizers for the cellulose ester material of Component (I), such as dioctyl phthalate, diisobutyl azelate, butyl stearate, butyl ethoxyethyl adipate, and triethyl phosphate.

The blends of this invention can be prepared by any of the conventional mixing or blending techniques such as mechanical mixing, blending on rolls, mixing in a Banbury mixer, extrusion and the like.

According to one aspect of this invention there is provided a composition comprising components as follows:

I. about 60 to about 98 percent by weight of the composition of a cellulose ester consisting essentially of cellulose acetate, cellulose acetate propionate, cellulose acetate butyrate or a combination of said cellulose esters.

II. about 2 to about 40 percent by weight of the composition of an elastomeric block copolymer having an elongation of at least about 90 percent and consisting essentially of repeating units having the following formula:

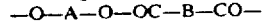

wherein —O—A—O— is from an amorphous polyether or polyester having a molecular weight from about 500 to about 10,000 and provides from about 60 to about 90 percent by weight of the block copolymer and —OC—B—CO— is from a crystalline polyester or polyurethane having a melting point above about 150° C. and said block copolymer has an inherent viscosity of at least 1.5 as measured at about 25° C. at about 0.25 percent by weight in 60/40 parts by weight of phenol/tetrachloroethane.

Another aspect provides a composition as set forth above comprising the following additional component:

III. from about 2 to about 10 percent by weight of the composition of an acrylic polymer or copolymer consisting essentially of 70 to 100 percent of the same or a combination of repeating units having the following formula:

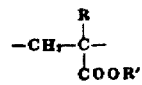

wherein R is a hydrogen atom or a methyl group and R' is a methyl or ethyl group, and up to 30 percent of repeating units having the same formula wherein R' is hydrogen or units from any other copolymerizable vinyl polymer, said acrylic polymer having an inherent viscosity measured at about 25° C. in dimethylformamide of at least about 0.3.

Another aspect provides a composition as set forth above comprising the following additional component:

IV. from about 0.5 to about 38 percent by weight of the composition of plasticizer for the cellulose ester which is Component (1).

Another aspect provides a composition as set forth above having a transparency ratio greater than 20 wherein said ratio is defined as follows:

$$\frac{I_0{}^\circ}{I_1{}^\circ}$$

said ratio being determined for a sheet 0.125 inch thick using a photometer (resolution of 10 minutes) and each I is the intensity of light transmitted at 0° and 1° with reference to an incident beam of monochromatic light having a wave length of 546 millimicrons. The higher this ratio the better the clarity of transparency.

Another aspect provides a composition as set forth above having a notched Izod impact strength (ASTM D256) of at least about 3.

The following examples are included for a better understanding of our invention. In each instance the notched Izod impact strength is determined according to ASTM D256. The testing bars are 0.125 inch thick.

EXAMPLE 1

Nine parts by weight of cellulose acetate butyrate (37 percent butyryl groups, 13 percent acetyl groups, 2 percent hydroxyl groups) with 1 part by weight of a block copolymer having an inherent viscosity of 2.2 and an elongation of 510 percent prepared from a mixture of 81 weight percent of 3,800 molecular weight poly(tetramethylene glycol) modified with six weight percent 8-oxabicyclononane, and 19 weight percent poly-(1,4-cyclohexylenedimethylene terephthalate), is mixed and a blend prepared by processing the mixture in a Brabender Plastigraph blending machine at 185° C. The resulting blend is injection molded and the testing bars thus formed found to have an Izod impact strength of 3.43 foot pounds per inch of notch at 23° C. and good optical clarity. In addition, melt flow under ASTM D-1238, condition "F", is 33.81.

By comparison, the use of a similar block copolymer of inherent viscosity = 0.91 gives very low Izod impact strength and extremely poor clarity. It is not included in this invention.

EXAMPLE 2

By comparison, the cellulose acetate butyrate of Example 1 without modification or plasticization when molded into testing bars gives an Izod impact strength of 0.99 foot pounds per inch of notch at 23° C. The melt flow under condition "F" is 3.02.

EXAMPLE 3

A blend of 9 parts by weight of the cellulose acetate butyrate described in Example 1 with 1 part by weight of an elastomer (inherent viscosity 4.7) prepared from a mixture of 2.2 mole parts of 2,000 molecular weight poly(tetramethylene glycol) and one mole part of 8-oxabicyclononane modified poly(tetramethylene glycol) containing 8 percent 8-oxabicyclononane with a polar segment consisting of p-xylene diisocyanate and 1,4-cyclo-hexanebis(methylamine), is prepared by processing the mixture in a Brabender Plastigraph at 185°-195° C. Testing bars molded from the blend are found to have an Izod impact strength of 4.54 foot pounds per inch of notch at 23° C. and good optical clarity. A melt flow of 5.38 is found using ASTM condition "F".

EXAMPLE 4

By comparison, testing bars molded from the unmodified cellulose acetate butyrate of Example 3 give an Izod impact strength of 1.1 foot pounds per inch of notch at 23° C.

EXAMPLE 5

A blend of 9 parts by weight of the cellulose acetate butyrate described in Example 1 with 1 part by weight of the elastomer described in Example 1 is prepared by processing the mixture in an extruder at 240° C. with a 1,000 pound back pressure. Testing bars molded from the resulting blend are found to have an Izod impact strength of 7.78 foot pounds per inch of notch at 23° C. Its optical clarity is excellent.

EXAMPLE 6

By comparison, a molded testing bar of the unmodified cellulose acetate butyrate of Example 5 is found to have an Izod impact strength of only 1.75 foot pounds per inch of notch at 23° C.

EXAMPLE 7

A blend of 9 parts by weight of the cellulose acetate butyrate described in Example 1 with 1 part by weight of a copolymer of poly(tetramethylene glycol)-8-oxabicyclononane having a molecular weight of about 7,604 and an inherent viscosity of about 0.6 is prepared by mechanical mixing. Testing bars formed from the blend are found to have an Izod impact strength of 1.42 foot pounds per inch of notch at 23° C. In addition, the bars are characterized by blushing and complete loss of optical clarity.

EXAMPLE 8

A blend of 9 parts by weight of the cellulose acetate butyrate described in Example 1 with 1 part by weight poly(tetramethylene glycol) having a molecular weight of 2,000 and an inherent viscosity of about 0.3 is prepared by mechanical mixing. Testing bars molded from the blend are found to have an Izod impact strength of 1.69 foot pounds per inch of notch at 23° C. The product suffers from severe warping, blushing, and complete loss of optical clarity.

EXAMPLE 9

A blend of nine parts by weight of the cellulose acetate butyrate described in Example 1 with one part by weight of poly(1,4-cyclohexylenedimethylene terephthalate) having an inherent viscosity of 0.76 is prepared by processing the mixture in a Brabender Plastigraph at 225° C. Testing bars molded from the blend are found to have an Izod impact strength of 1.5 foot pounds per inch of notch at 23° C., and are opaque.

EXAMPLE 10

A blend of 17 parts by weight of the cellulose acetate butyrate described in Example 1 with 2 parts by weight of the block copolymer elastomer described in Example 1, and 1 part by weight of polyethylacrylate having an inherent viscosity of 1.0 is prepared by processing the mixture in an extruder at 220° C. and a 3,000 pound back pressure. Testing bars molded from the resulting blend are found to have an Izod impact strength of 6.0 foot pounds per inch of notch at 23° C.